UNITED STATES PATENT OFFICE.

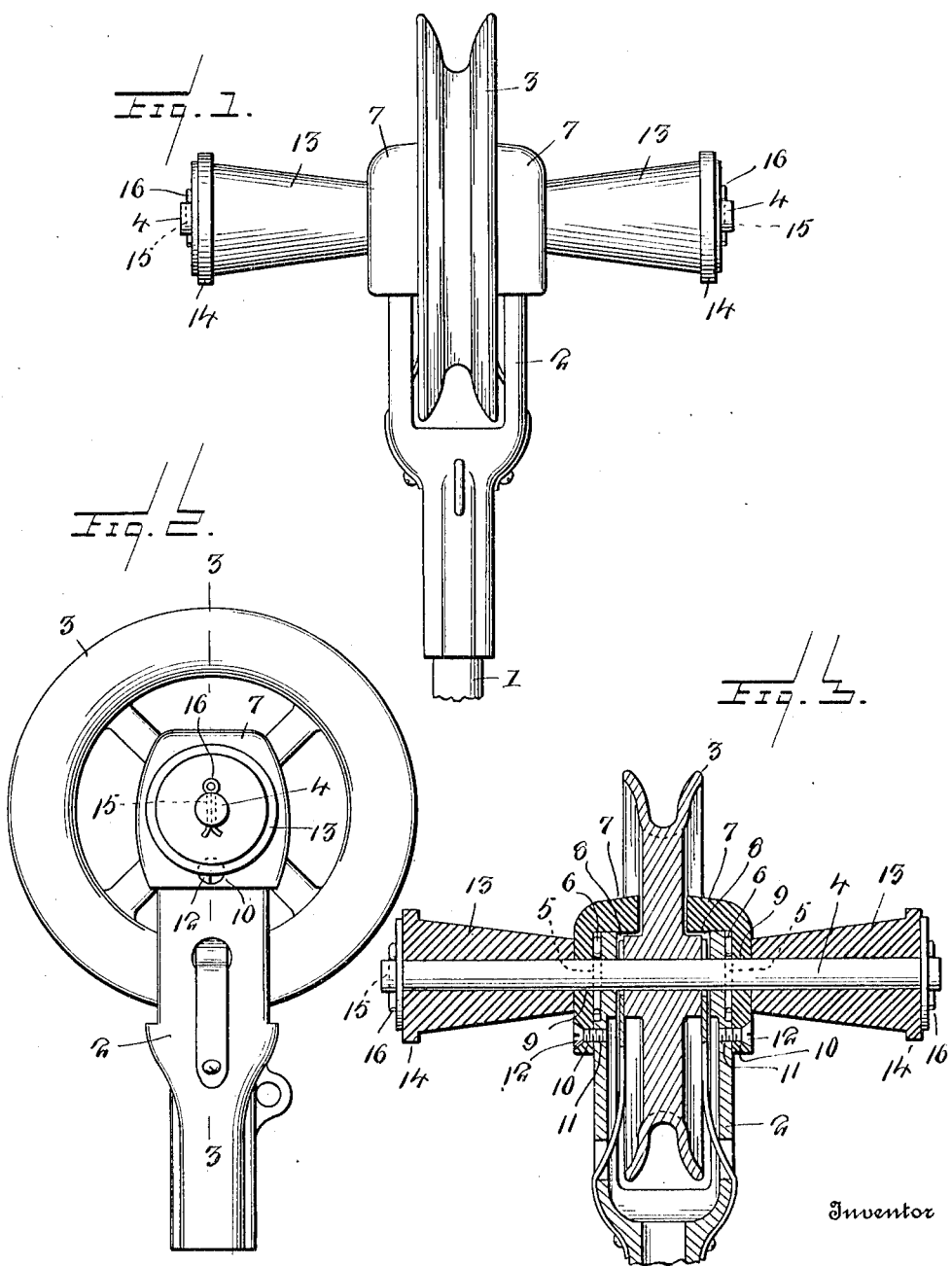

FRANCIS A. SCHMEDINGHOFF, OF KANSAS CITY, MISSOURI.

TROLLEY ATTACHMENT.

1,089,968.  Specification of Letters Patent.  Patented Mar. 10, 1914.

Application filed April 29, 1913. Serial No. 764,382.

*To all whom it may concern:*

Be it known that I, FRANCIS A. SCHMEDINGHOFF, a citizen of the United States, residing at Kansas City, in the county of Jackson and State of Missouri, have invented new and useful Improvements in Trolley Attachments, of which the following is a specification.

The present invention relates to improvements in trolley wheels, the object of the invention being to provide an attachment comprising non-electric conductors for the ordinary construction of trolley harps and wheels which are disposed on the opposite sides of the said harp and wheel to receive and support the trolley wire after the wheel has accidentally left the wire to shut off the current between the wheels and wire and stop the car and also to prevent the said wheel contacting with the guy wires or supporting poles for the over-head trolley wires and inflicting damage to the same.

Another object of the invention is the provision of an attachment for any ordinary trolley wheel and harp which comprises a box of non-electric conducting material which is detachably secured to each of the arms of a harp and which is adapted to be sustained within the grooves in the opposite faces of the wheel, whereby the trolley wheel leaving the wire and having one of its sides springing into contact with the wire will be guided upon non-electric conducting headed frusto-conical rollers mounted upon a shaft which extends through the boxes and to the opposite sides of the harp and so prevent the swinging of the trolley and to retain the wire in close proximity with the wheel, so that said wire may be easily replaced upon the wheel.

With the above recited objects in view, and others which will appear as the nature of the invention is more fully understood, the improvement resides in the construction, combination and arrangement of parts set forth in the following specification and falling within the scope of the appended claim.

In the drawings: Figure 1 is a view of the trolley wheel provided with my improvement, Fig. 2 is a side elevation of the same, and Fig. 3 is a sectional view on the line 3—3 of Fig. 2.

Referring now to the drawings in detail, 1 designates the trolley pole, 2 the harp for the pole and 3 the trolley wheel which is mounted upon a shaft arranged in bearings in the harp. These parts are of the ordinary or common construction. The shaft or axle for the trolley wheel is provided with openings for the reception of the securing elements in the nature of cotter pins, and the said cotter pins are received in suitable depressions or channels upon the outer faces of the arms of the harp.

With my improvement the ordinary axle or shaft is removed, and an elongated shaft or axle 4 is employed. This shaft passes through the bearings and the bore of the trolley wheel, and the said shaft is provided with suitable openings 5 which are adapted to receive cotter pins 6 which engage within the channels or depressions in the side or arm members of the harp provided thereon, as above stated. The axle 4 extends a suitable distance beyond the opposite sides of the harp, and the numerals 7 designate box members which have their inner faces recessed, as at 8, to correspond with the shape of the upper portions of the arms of the harp, the depressions being sufficiently deep to permit of the boxes fully inclosing the portions of the harp upon which the boxes are slid and also to lie within the grooved side faces of the trolley wheel. Each box has an opening 9 whereby the same is passed over the shaft 4, and each box is further provided with an opening 10 which has its outer face countersunk and which is adapted to register with a threaded opening 11 in the sides of the harp, the registering openings being adapted for the reception of securing elements in the nature of screws 12.

Mounted for rotation upon the projecting ends of the shaft 4 are frusto-conical rollers 13, each of which has its enlarged outer end formed with a continuous flange 14, and the outer ends of the shaft 4 are provided with openings 15 for the reception of cotter pins 16 whereby the frusto-conical rollers 13 are retained upon the shaft 4 and in contact with the outer faces of the boxes 7. The boxes 7 and the cone-shaped rollers 13 are constructed of non-electric conducting material, and from the above description taken in connection with the drawings, it will be noted that should the trolley wheel accidentally leave the wire and the spring upon the trolley pole force the same in an upward direction, the wire will be contacted by one of the cone-shaped rollers 13, or if contacted by the upper face of either of the boxes 7, the said wire cannot fall between the arms of the harp and the wheel, and the tops of the boxes are preferably beveled or inclined outwardly, so that the wire will be directed upon the rollers 13. When the wire leaves the trolley and rests upon either of the rollers, the said rollers will have a tendency to force the wire against the box. When the wire engages with either of the non-conducting rollers or boxes, the current is cut off from the car, and the car, of course, is stopped. The wire is retained in close proximity to the trolley wheel, so that upon lowering the said wheel the wire will be readily directed against the side of the wheel and to within the groove of the wheel.

From the above description, taken in connection with the accompanying drawings, the simplicity of the device as well as the advantages thereof, will, it is thought, be perfectly apparent to those skilled in the art to which such inventions appertain without further detailed description.

Having thus described the invention, what I claim as new is:

The combination of a trolley harp having an axle which projects beyond its sides and a trolley wheel mounted upon the axle between the arms of the harp, and rollers upon the extending ends of the axle, box members constructed of non-electric conducting material arranged upon the shaft between the rollers and the outer faces of the harp arms, each of said boxes having its inner face recessed to provide a pocket for the reception of the arm of the harp upon which it is arranged, the said recesses being deep to permit of the inner faces of the boxes being disposed just out of contact with the opposite sides of the trolley wheel, and screw members for securing the boxes to the arms of the harp.

In testimony whereof I affix my signature in presence of two witnesses.

FRANCIS A. SCHMEDINGHOFF.

Witnesses:
WM. T. YOUNG,
LOYD J. GRIFFITH.

---

Copies of this patent may be obtained for five cents each, by addressing the "Commissioner of Patents, Washington, D. C."